United States Patent [19]

Matsuki et al.

[11] Patent Number: 5,458,369
[45] Date of Patent: Oct. 17, 1995

[54] STARTING DEVICE AND SEAT BELT TIGHTENING APPARATUS

[75] Inventors: Masuo Matsuki; Katsuyasu Ono, both of Kanagawa, Japan

[73] Assignee: NSK Ltd., Tokyo, Japan

[21] Appl. No.: 197,743

[22] Filed: Feb. 17, 1994

[30] Foreign Application Priority Data

Mar. 9, 1993 [JP] Japan ........................... 5-015581
Mar. 12, 1993 [JP] Japan ........................... 5-016536

[51] Int. Cl.[6] .......................... B60R 22/46; B60R 21/32
[52] U.S. Cl. .................. 280/806; 180/282; 102/272; 42/70.08; 200/61.45 M
[58] Field of Search ................... 280/806, 734, 280/735; 180/282; 297/480; 73/517 R; 200/61.45 R, 61.53, 61.45 M; 42/70.08, 99; 102/272, 275

[56] References Cited

U.S. PATENT DOCUMENTS

| 2,436,396 | 2/1948 | McCaslin | 102/272 |
| 3,171,913 | 3/1965 | Kersh | 200/61.53 |
| 4,658,529 | 4/1987 | Bertolini | 42/70.08 |
| 4,955,638 | 9/1990 | Kinoshita et al. | 280/806 |
| 5,129,680 | 7/1992 | Mori | 280/806 |
| 5,143,403 | 9/1992 | Föhl | 280/806 |
| 5,149,134 | 9/1992 | Fohl | 280/806 |
| 5,383,388 | 1/1995 | Ono | 280/806 |

FOREIGN PATENT DOCUMENTS

| 483862 | 7/1992 | Japan. | |
| 2220128 | 1/1990 | United Kingdom. | |
| 2263387 | 7/1993 | United Kingdom | 280/806 |
| WO9005652 | 5/1990 | WIPO. | |

Primary Examiner—Karin L. Tyson
Assistant Examiner—Peter C. English
Attorney, Agent, or Firm—Sughrue, Mion, Zinn, Macpeak & Seas

[57] ABSTRACT

A starting device (21, 121, 41) for actuating a gas generator (8) by striking a detonator (10) in response to an acceleration of a predetermined level or more. The starting device includes a firing pin (22), an inertial mass (23), an annular permanent magnet (24) and an erroneous-actuation preventing mechanism (9, 109, 42). The firing pin (22) is capable of igniting the detonator (10) by moving toward and colliding against the detonator (10). The inertial mass (23) is made of a cylindrical permanent magnet for supplying kinetic energy to the firing pin (22). The annular permanent magnet (24) has an inside diameter larger than an outside diameter of the inertial mass (23). The erroneous-actuation preventing mechanism (9,109, 42) prevents the erroneous actuation of the starting device (21, 121, 41). The erroneous-actuation preventing mechanism (9,109, 42) includes a restricting member for selectively setting the inertial mass (23) in a nonmovable state and in a movable state.

16 Claims, 12 Drawing Sheets

STARTING DEVICE AND SEAT BELT TIGHTENING APPARATUS

BACKGROUND OF THE INVENTION

The present invention relates to a seat belt tightening apparatus for rotating a takeup shaft of a retractor in a seatbelt retracting direction at a vehicle collision and a starting device for actuating the seat belt tightening apparatus or an air bag apparatus for protecting a vehicle occupant from an impact at a collision by means of an air bag inflated suddenly by a gas. More particularly, the present invention concerns improvements of an erroneous-actuation preventing mechanism of the starting device.

In recent years, passive restraining apparatuses, such as seat belt tightening apparatuses and air bag apparatuses, have been used extensively for the purpose of protecting vehicle occupants at the time of an emergency such as a vehicle collision or the like.

The aforementioned seat belt tightening apparatus is arranged such that a piston is coupled to one end of a wire member wound around a pulley pivotally attached to a takeup shaft of, for instance, a retractor, and a tensile force is exerted on the wire member by means of a thrust caused by the expansion pressure of gaseous matter acting on the piston which is slidably accommodated in a cylinder. As the wire member retracts and drives the shaft of the retractor in a webbing taking-up direction, a webbing which is applied to the occupant is retracted at the time of an emergency.

In addition, the aforementioned air bag apparatus is arranged as follows. A module which includes a center pad, a folded air bag, an inflator (gas generator), and the like is accommodated in, for instance, a steering wheel. The inflator is ignited at a vehicle collision, and as the air bag is instantly inflated by the suddenly burned gas, the body of the occupant is received by the inflated air bag, thereby reducing the impact applied to the human body to a low level.

As starting devices for actuating the seat belt tightening apparatus and the air bag apparatus by detecting the vehicle collision, a mechanical-type starting device is known which is arranged as follows. A firing pin which is normally held at a nonoperable position is ejected toward a detonator by making use of the operation of an inertial mass which is displaced by an inertial force occurring during a vehicle collision, for example. This causes ignition powder to be ignited, and the seat belt tightening apparatus or the air bag apparatus mentioned above are actuated by an explosive force thereof.

As for assemblies of the seat belt tightening apparatus or the air bag apparatus, which are provided with the mechanical-type starting devices, the starting devices must not be actuated before their installation in the vehicle, and must be provided with an erroneous-actuation preventing mechanism. Accordingly, mechanical-type starting devices provided with various erroneous-actuation preventing mechanisms have been proposed. For example, those disclosed in Japanese Utility Model Unexamined Publication No. 83862/ 1992, U.S. Pat. No. 5,129,680, and the like are known.

The collision sensor (starting device) disclosed in Japanese Utility Model Unexamined Publication No. 83862/ 1992 is provided with a safety device which comprises an ignition pin (firing pin) urged toward a detonator, an inertial mass adapted to move on collision, and a rotating member (trigger means) having a lever for urging the inertial mass in a direction opposite to the direction of the collision and adapted to retain the firing pin, the safety device further comprising interfering means for locking or unlocking the inertial mass or the lever. The collision sensor is prevented from being actuated erroneously (being exploded) by locking the movement of the inertial mass by means of the interfering member of the safety device which is set in a locked or unlocked position by the rotation of a rotating shaft.

However, with the starting device in which the firing pin is collides with the detonator which is provided with ignition powder, the inertial mass, the firing pin, and energy supplying means, such as a coil spring, for imparting impact energy for the detonator to the firing pin are formed as separate members. For this reason, even if the movement of the inertial mass is restricted to set the starting device in the nonoperable state, since the firing pin still holds the impact energy for igniting the detonator, there is a possibility of the starting device being actuated as the trigger means is released by some unexpected factor even if the movement of the inertial mass is prevented.

This is attributable to the following, since the inertial mass is disposed in a limited space, it is difficult to increase the energy for moving the trigger means, and the response time of the starting device from the time the inertial mass moves until the ignition powder is ignited must be minimized. For this reason, a retaining allowance at an abutment portion between the firing pin and the trigger means for retaining the firing pin is generally small, so that a setting is provided such that the retention of the firing pin is canceled by the slightest movement of the trigger means. Accordingly, there has been a problem in that the trigger means is released inadvertently if an impact such as a drop is imparted to an assembly provided with such a starting device, or if a deformation or the like is present in the case of the starting device.

Accordingly, acceleration sensors disclosed in U.S. Pat. No. 4,955,638 and the like comprise a safety device (erroneous-actuation preventing mechanism) which has setting members respectively provided with a portion which interferes with the displacement of a sensor mass (inertial mass) supported to be moveable in a direction opposite to the direction of acceleration to be able to undergo displacement by means of an inertial force occurring when an acceleration of a predetermined level or more acts thereon, and a portion which interferes with the displacement of energy releasing means (firing pin) constantly supported resiliently to be capable of undergoing displacement toward an actuating position for releasing the energy. In other words, since the erroneous actuation of the acceleration sensor is prevented by setting the displacement of both the inertial mass and the firing pin in a restricted state by means of the positions of the setting members, it is possible to prevent the firing pin from colliding against the detonator should the retention of the firing pin be canceled in the event of such as the breakage of the trigger means.

In addition, a preloader sensor (starting device) disclosed in U.S. Pat. No. 5,129,680 comprises releasing means for setting the preloader sensor in a nonoperable state and an operable state; urging means for urging the releasing means in a direction in which the preloader sensor is set in the nonoperable state; and joining means for joining a webbing retractor to a vehicle body and having a moving locus at a position in which the joining means interferes with the releasing means. The joining means is adapted to set the releasing means in a state capable of actuating the preloader sensor in a state in which the joining means interferes with the releasing means against the urging force of the urging means by moving a predetermined distance on the moving locus. The joining means is also adapted to set the releasing means in a state preventing the actuation of the preloader sensor by means of the urging force of the urging means in a state in which the joining means does not interfere with the releasing means.

Accordingly, in the webbing retractor before installation in the vehicle, the preloader is prevented from being actuated erroneously (exploded) by virtue of the urging means and the releasing means for setting the preloader sensor in the nonoperable state. Then, if the webbing retractor is joined to the vehicle body by means of a releasing bolt which is the joining means so as to install the webbing retractor in the vehicle, the releasing bolt interferes with the releasing means and sets the releasing means in the state capable of actuating the preloader sensor, thereby rendering the preloader sensor operable simultaneously with installation on the vehicle body.

However, in the case of the erroneous-actuation preventing mechanism for preventing the erroneous actuation of the starting device by preventing the movement of the inertial mass and the firing pin as in U.S. Pat. No. 4,955,638, there is a gap between the setting member for restraining the displacement of the firing pin and a retaining portion of the firing pin, so that the firing pin is movable toward the detonator by the portion of that gap with respect to the setting member. Accordingly, if an unexpected impact acts on an assembly provided with such a starting device, and the retention of the firing pin by the trigger means is canceled, the firing pin moves by the portion of the gap until the retaining portion abuts against the setting member. Then, since the firing pin the retention of which by the trigger means is canceled cannot return to its original position by itself, if the erroneous-actuation preventing mechanism is released, the firing pin which is not retained by the trigger means collides against the detonator and ignites the same. Therefore, such a starting device additionally requires a separate mechanism for pushing back the firing pin to a predetermined position, and the structure becomes complicated, so that there are problems in that the number of components used increases, the assembly efficiency is poor, and the manufacturing cost is high.

Meanwhile, in the case of the preloader sensor disclosed in U.S. Pat. No. 5,129,680, the preloader sensor is set in the operable state by tightening the releasing bolt which is an upper attaching bolt for the webbing retractor. Therefore, if the upper attaching bolt is tightened first at the time of installing the webbing retractor in the vehicle, there is a possibility of the preloader being erroneously actuated during the operation of tightening a lower attaching bolt.

In addition, the releasing bolt, which is the upper attaching bolt, sets the releasing means in the state capable of actuating the preloader sensor as a tip portion of the bolt interferes with the releasing means at the time of tightening, so that a sufficient length of the bolt is required. In the event that a releasing bolt having a different length is used as the upper attaching bolt to be used, or if the tightening of the releasing bolt is not carried out completely, there is a possibility of the preloader sensor being installed in the vehicle body with the preloader sensor remaining in the nonoperable state. In other words, even if the upper attaching bolt is tightened incompletely, it is possible to carry out the subsequent operation of installation on the vehicle body such as the fitting of interior trim for covering the webbing retractor. Hence, there is the possibility of the operation of installation on the vehicle body being finished with the preloader sensor remaining in the nonoperable state.

SUMMARY OF THE INVENTION

Accordingly, an object of the present invention is to provide a starting device having an inexpensive erroneous-actuation preventing mechanism which is capable of positively and easily preventing the erroneous actuation of the starting device, thereby overcoming the above-described drawbacks.

In addition, another object of the present invention is to provide a starting device having an erroneous-actuation preventing mechanism which has excellent assembling efficiency and is capable of positively and easily preventing the erroneous actuation of the starting device without being installed on the vehicle body in the nonoperable state, thereby overcoming the above-described drawbacks.

To these ends, in accordance with one aspect of the present invention there is provided a starting device for actuating a gas generator by striking a detonator in response to an acceleration of a predetermined level or more, comprising: a firing pin capable of igniting the detonator by moving toward and colliding against the detonator; an inertial mass made of a cylindrical permanent magnet for supplying kinetic energy to the firing pin; an annular permanent magnet having an inside diameter larger than an outside diameter of the inertial mass; and an erroneous-actuation preventing mechanism for preventing the erroneous actuation of the starting device, the erroneous-actuation preventing mechanism including restricting means for selectively setting the inertial mass in a nonmovable state and in a movable state.

In accordance with another aspect of the present invention there is provided a starting device for use in a seat belt tightening apparatus for rotating a takeup shaft of a retractor in a seat-belt retracting direction at a vehicle collision by being driven under gas pressure, so as to actuate a gas generator by striking a detonator in response to an acceleration of a predetermined level or more, comprising: a firing pin capable of igniting the detonator by moving toward and colliding against the detonator; an inertial mass made of a cylindrical permanent magnet for supplying kinetic energy to the firing pin; an annular permanent magnet having an inside diameter larger than an outside diameter of the inertial mass; and an erroneous-actuation preventing mechanism for preventing the erroneous actuation of the starting device, the erroneous-actuation preventing mechanism including restricting means for selectively setting the inertial mass in a nonmovable state and in a movable state.

In accordance with still another aspect of the present invention there is provided a seat belt tightening apparatus for rotating a takeup shaft of a retractor in a seat-belt retracting direction at a vehicle collision by being driven under gas pressure, comprising: a starting device for actuating a gas generator by striking a detonator in response to an acceleration of a predetermined level or more; and an erroneous-actuation preventing mechanism for preventing the erroneous actuation of the starting device, the erroneous-actuation preventing mechanism including restricting means for selectively setting in a nonmovable state and in a movable state an inertial mass fitted in the starting device.

In accordance with the above-described arrangement of the present invention, since, at a vehicle collision, the inertial mass itself in which an acceleration of a predetermined level or more has occurred is capable of imparting impact energy to the detonator, a-trigger shaft for canceling the restriction of movement of the firing pin in response to the movement of the inertial mass and an urging member for urging the firing pin toward the detonator become unnecessary. At the same time, the firing pin is prevented from moving toward the detonator simply by preventing the movement of the inertial mass toward the detonator. Therefore, it is possible to prevent the erroneous actuation of the starting device with a simple structure.

In addition, when the inertial mass is set in the nonmovable state by the restricting means, even if the inertial mass moves toward the detonator by the portion of the gap occurring between the restricting means for restricting the movement of the inertial mass and a retaining portion for retaining the inertial mass by an unexpected impact, the inertial mass is pushed back to a predetermined position by the magnetic repulsive force with respect to the annular permanent magnet. Hence, the firing pin is prevented from igniting the detonator the moment the restricting means is deactivated to set the inertial mass in the movable state.

Furthermore, in accordance with the above-described arrangement of the present invention, the manipulating member cannot be swung to the closing position unless the joining means is in a positively tightened state. Therefore, unless the assembly is secured to the vehicle body, the inertial mass is in the nonmovable state, with the result that the starting device cannot be actuated.

In addition, unless the manipulating member is swung from the open position to the closing position to move the restricting means in a direction in which the inertial mass becomes movable, a swinging end of the manipulating member interferes with a cover member for covering the assembly, thereby hampering the continuation of the operation of installation on the vehicle body. Therefore, after the assembly is secured to the vehicle body, the manipulating member must be held in a state in which it is swung positively to the closing position.

BRIEF DESCRIPTION OF THE PREFERRED EMBODIMENTS

Figure 1:
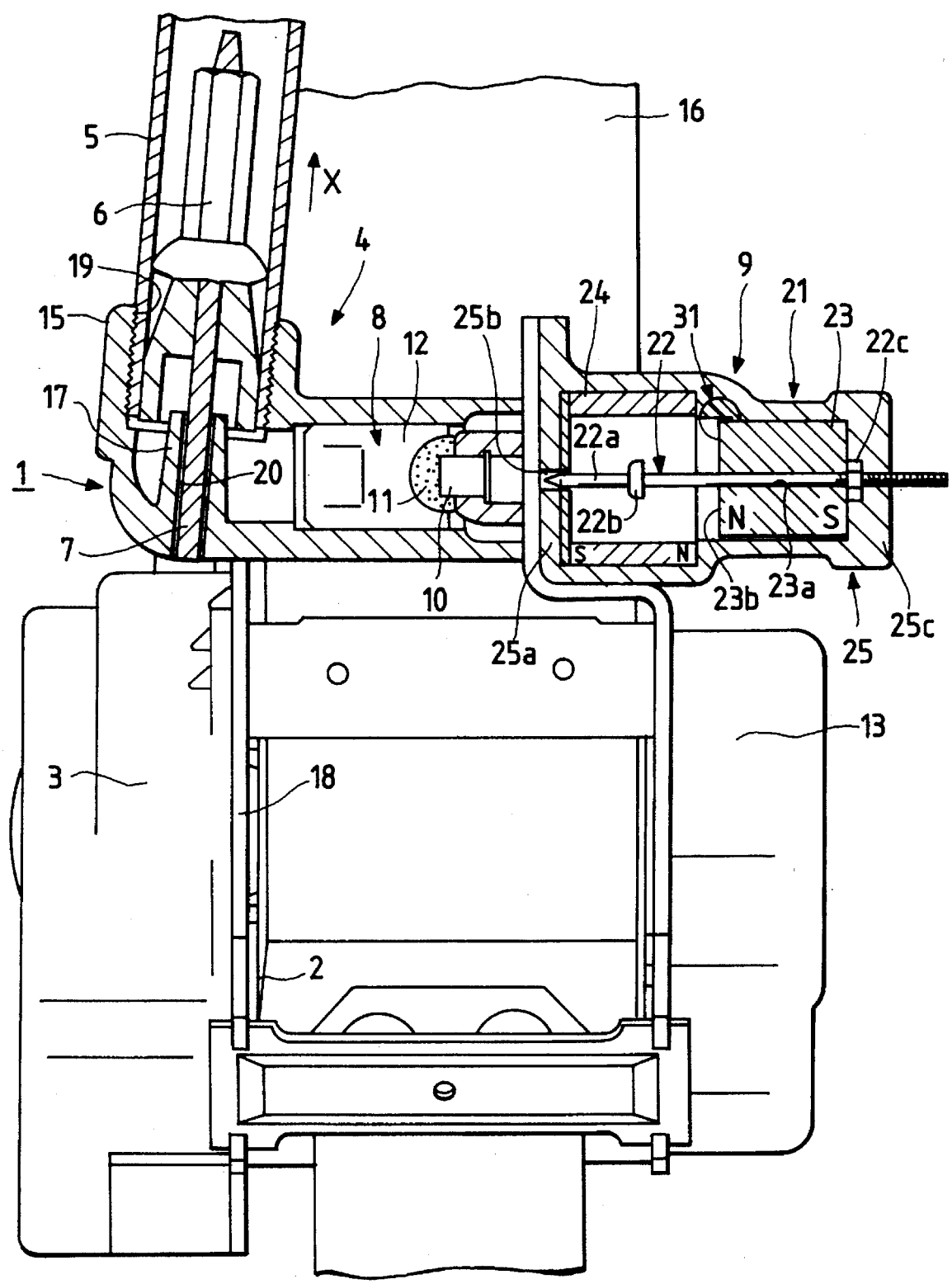
FIG. 1 is a partial front plane view of a retractor with a pretensioner having a starting device in accordance with a first embodiment of the present invention.
Figure 5A:
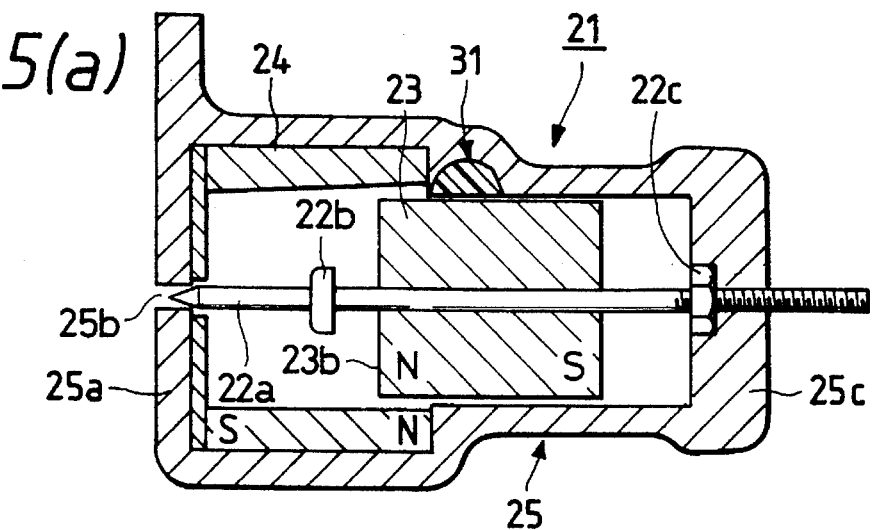
Figure 5B:
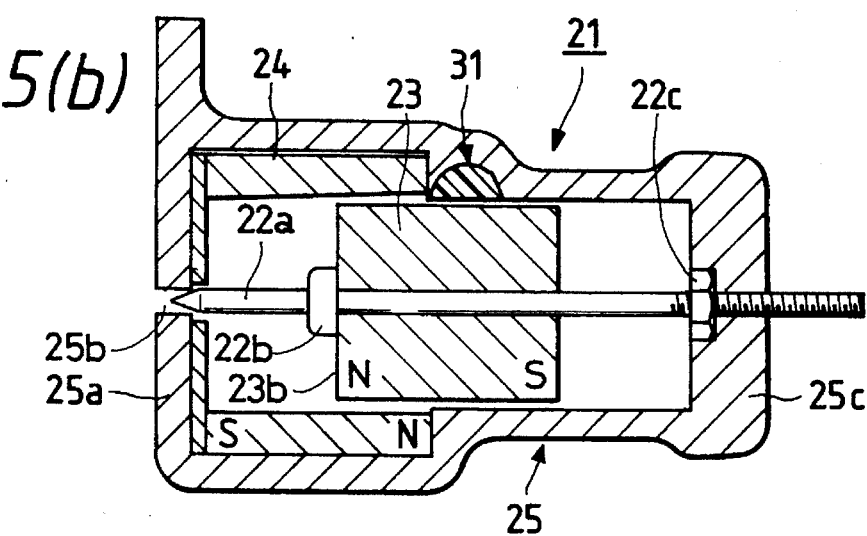
Figure 5C:
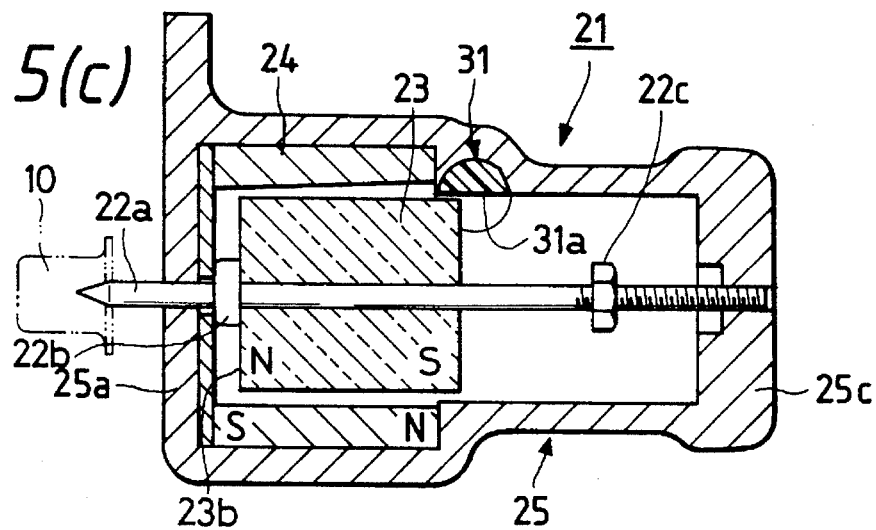
Figure 6:
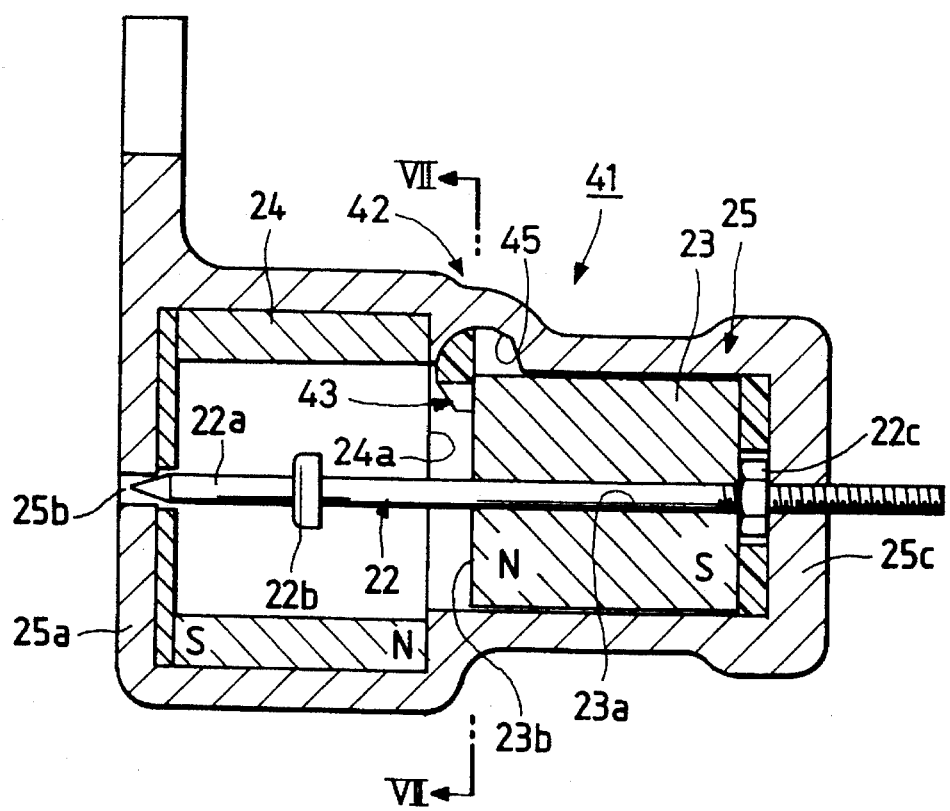
Figure 7:
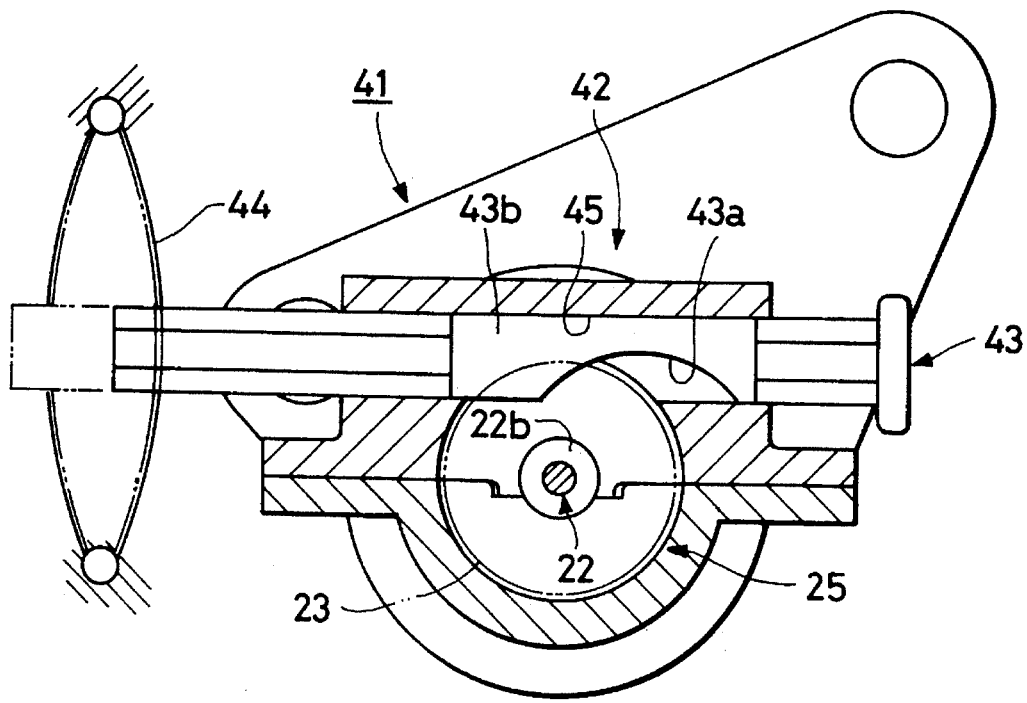
Figure 8:
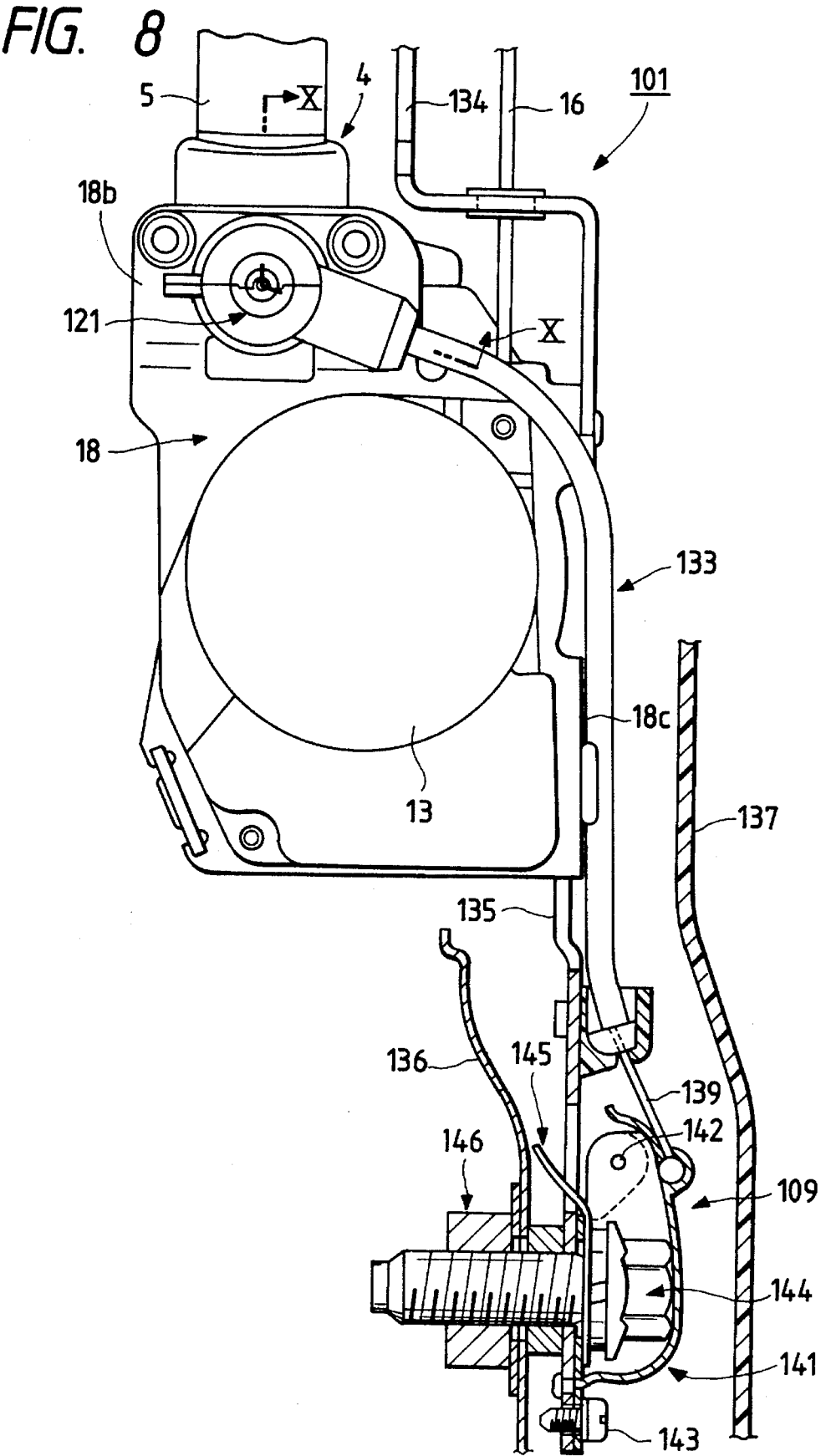
Figure 9:
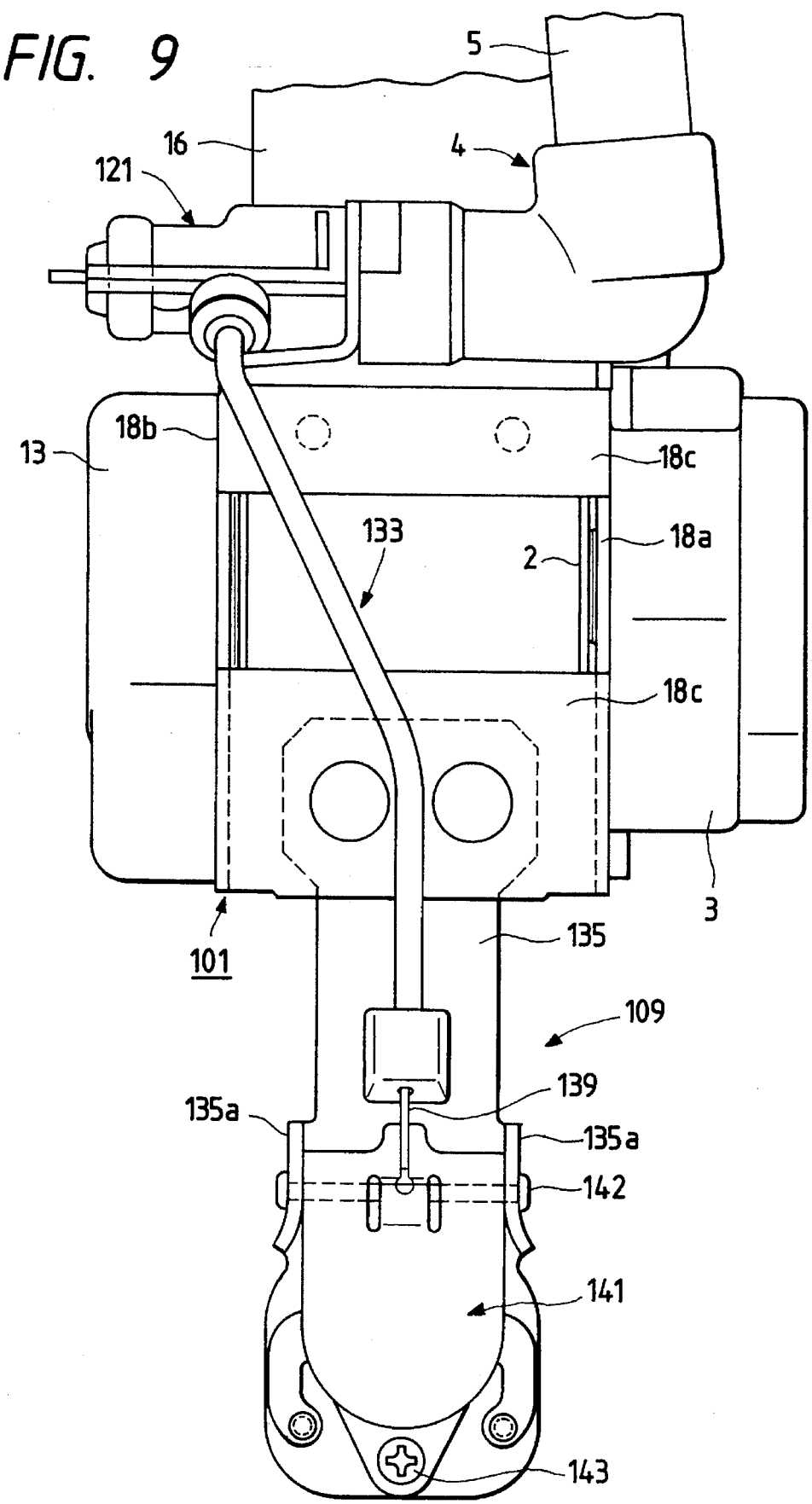
Figure 10:
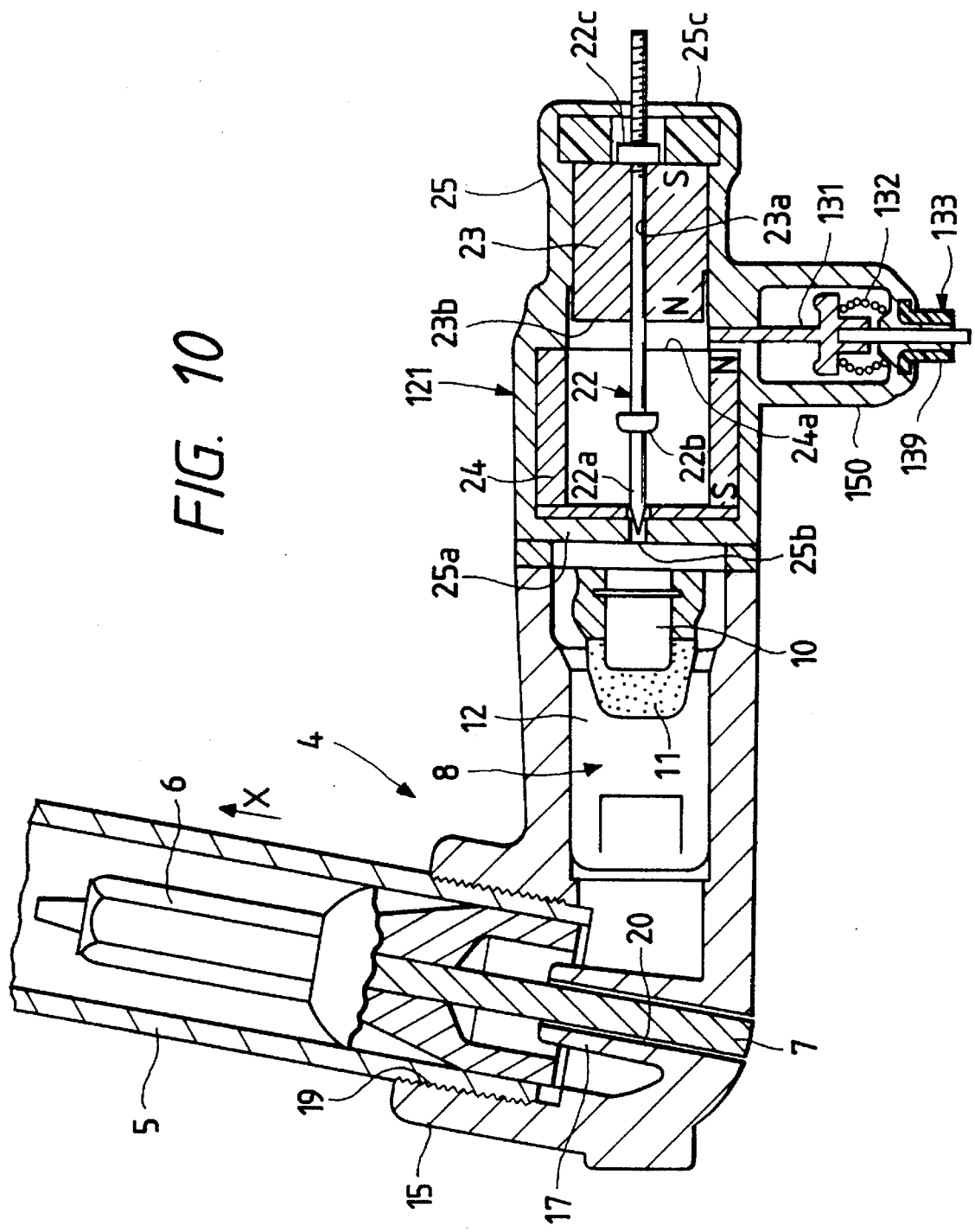
Figure 11:
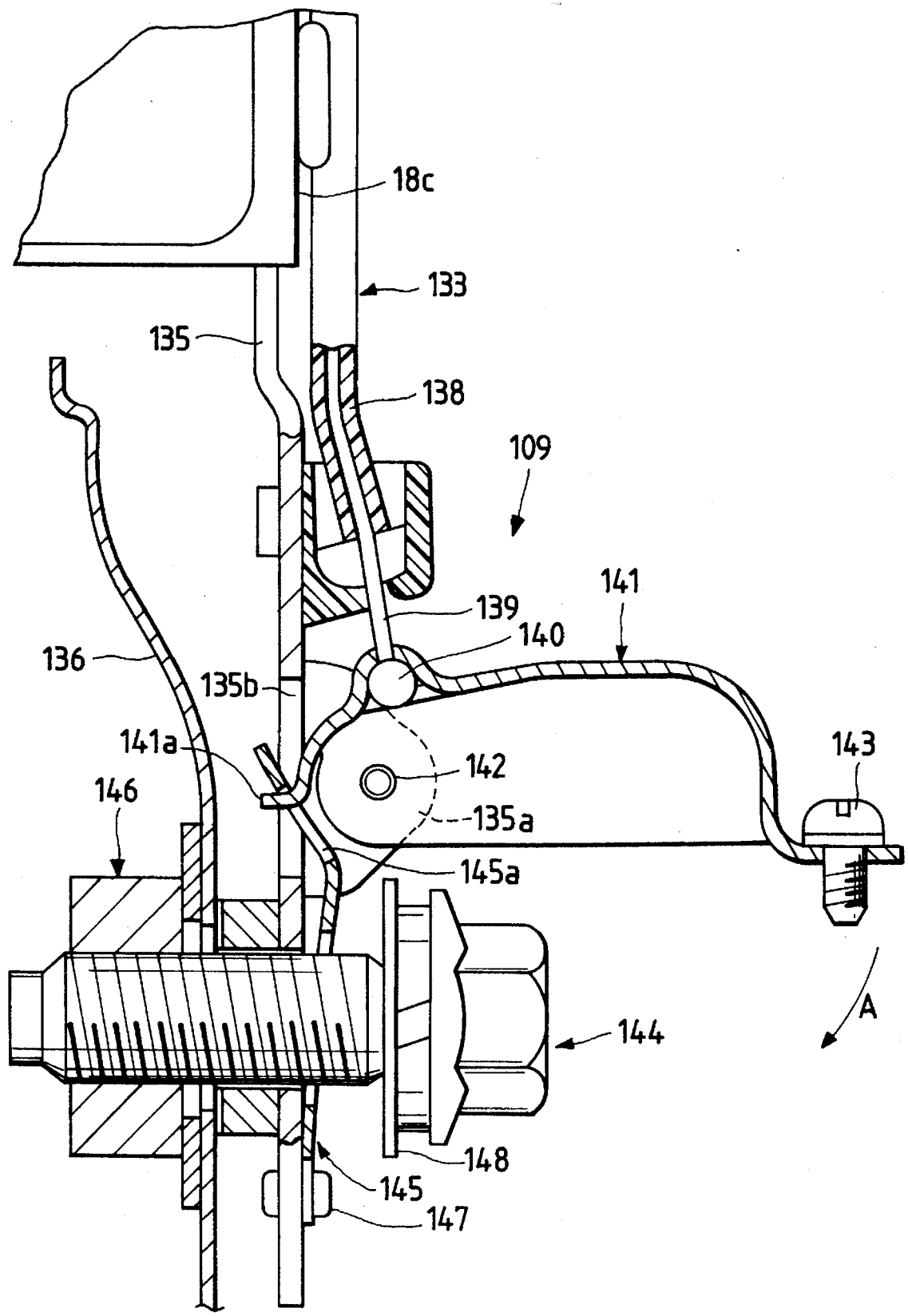
Figure 12:
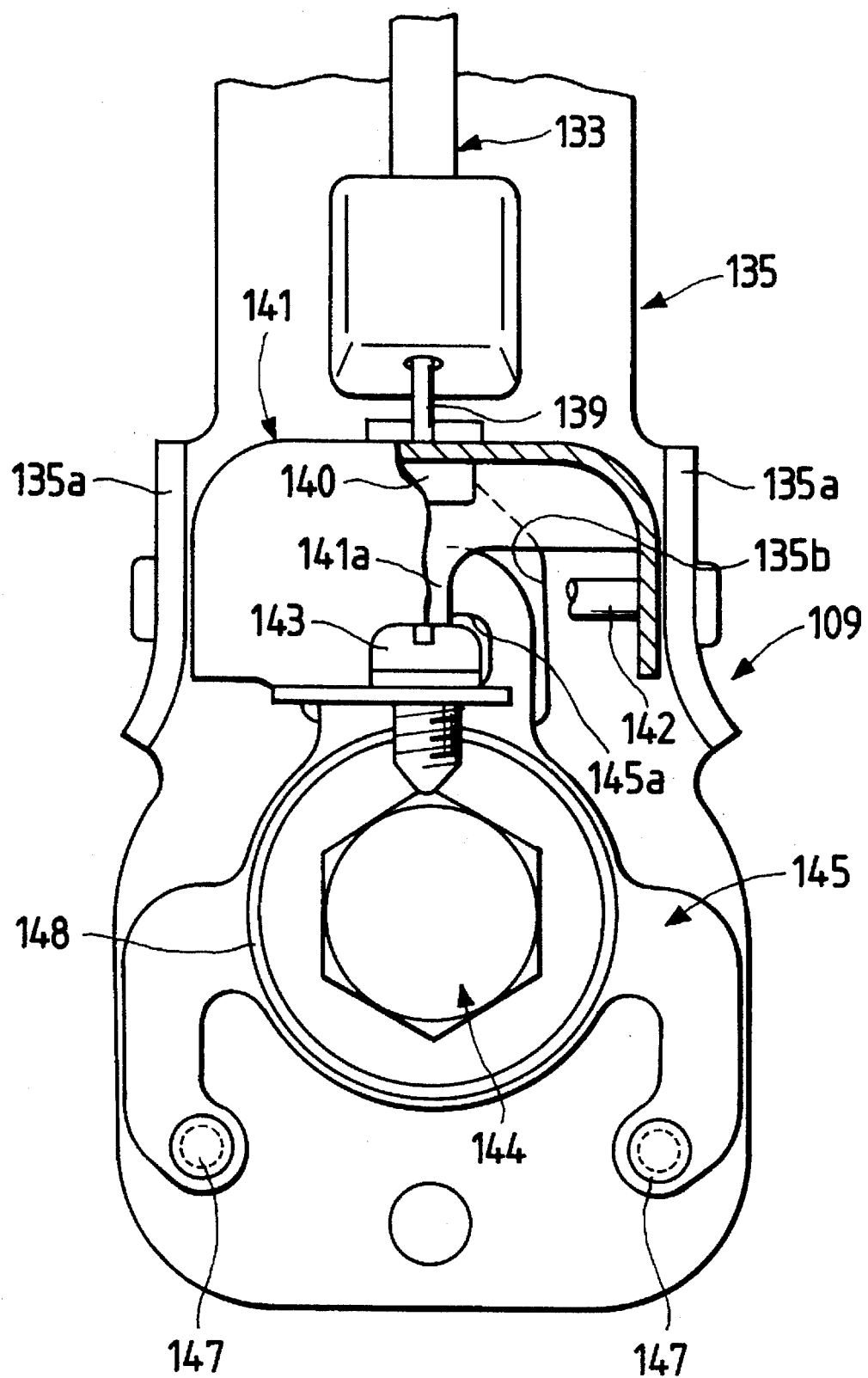
Figure 13:
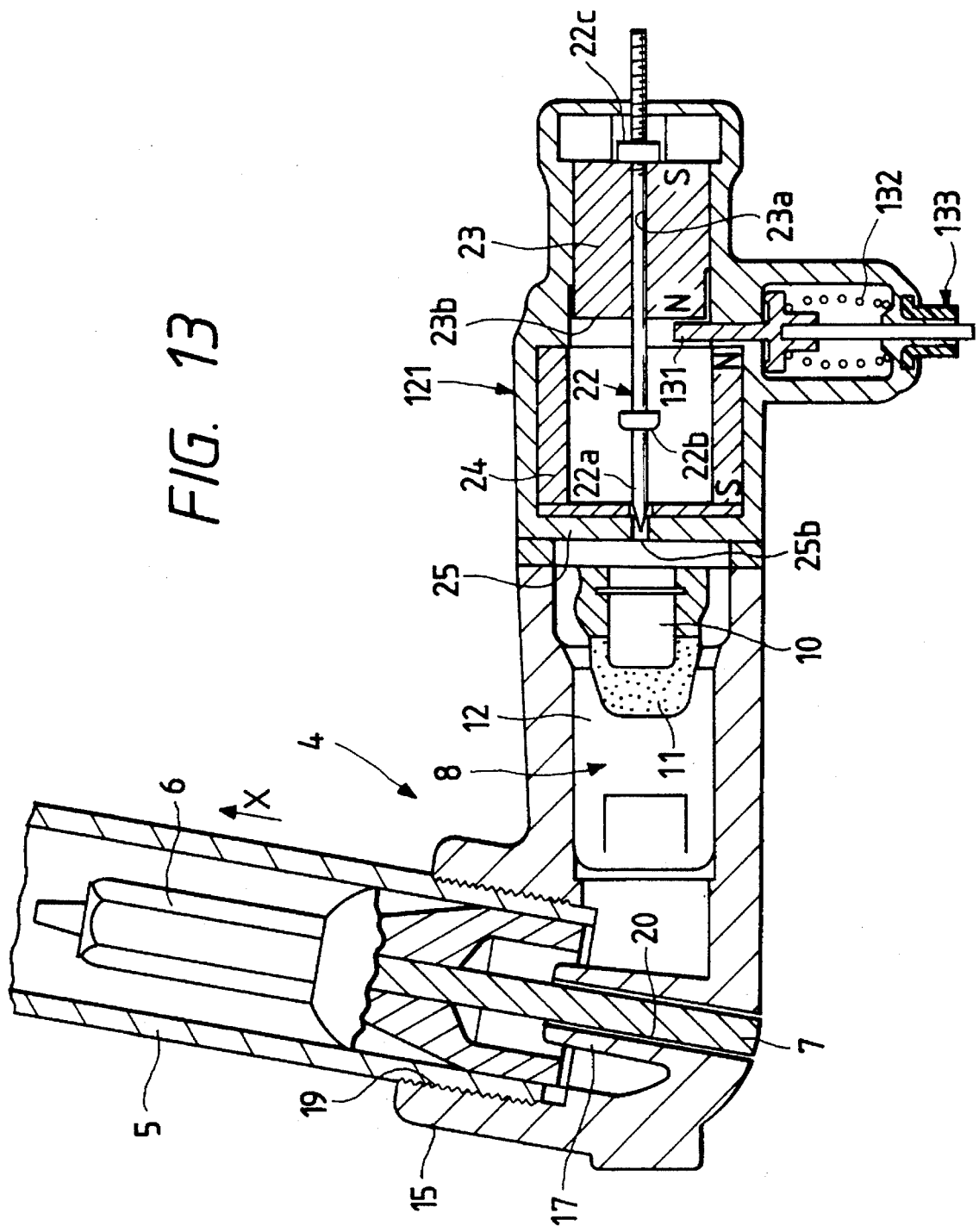
Figure 14:
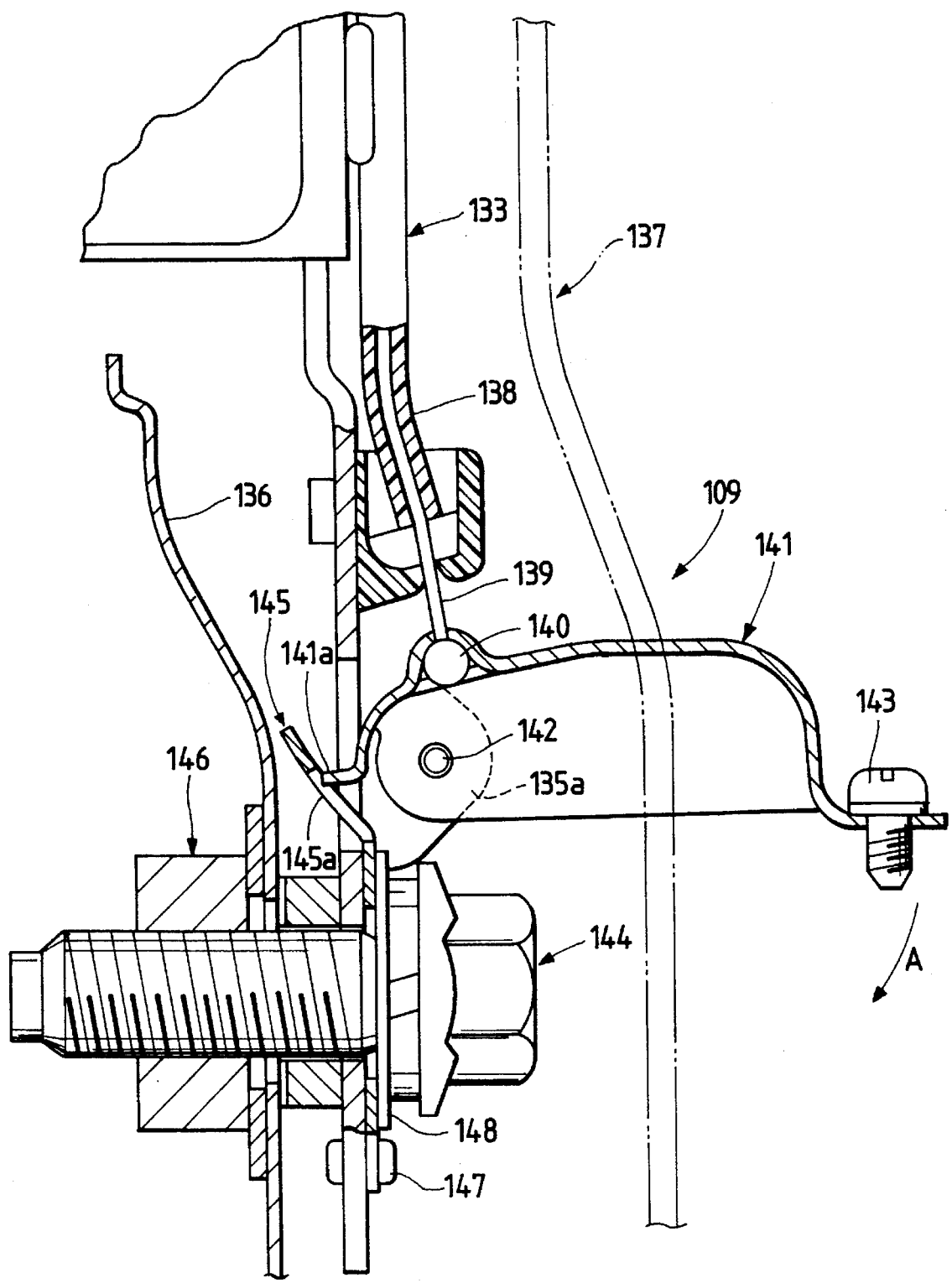

FIG. 5(a), 5(b) and 5(c) are vertical cross-sectional views explaining the state of operation of the starting device shown in FIG. 1;

FIG. 6 is a vertical cross-sectional view of a starting device in accordance with a second embodiment of the present invention;

FIG. 7 is a cross-sectional view of the starting device shown in FIG. 6, the view being taken in the direction of arrows along line VII—VII;

FIG. 8 is a partial side plane view of a retractor with a pretensioner in accordance with a third embodiment of the present invention;

FIG. 9 is a partial rear view of the retractor with a pretensioner shown in FIG. 8;

FIG. 10 is a cross-sectional view of the starting device shown in FIG. 8, the view being taken in the direction of arrows along X—X;

FIG. 11 is an enlarged cross-sectional view of an essential portion explaining the operation of installing the retractor with a pretensioner shown in FIG. 8;

FIG. 12 is an enlarged rear view of the essential portion explaining the operation of installing the retractor with a pretensioner shown in FIG. 8;

FIG. 13 is a cross-sectional view of an essential portion of the starting device in the state in which an erroneous-actuation preventing mechanism is actuated; and FIG. 14 is an enlarged cross-sectional view of an essential portion explaining the operation of installing the retractor with a pretensioner shown in FIG. 8.

DETAILED DESCRIPTION OF THE PREFERRED EMBODIMENTS

Referring now to the accompanying drawings, a detailed description will be given of the embodiments of the present invention.

FIGS. 1 to 5 show a first embodiment of the present invention. FIG. 1 is a partial front plane view of a retractor 1 with a pretensioner having a starting device in accordance with this embodiment.

The retractor 1 with a pretensioner has a takeup reel 2 around which a webbing 16 is wound in such a manner as to be capable of freely taking up or spooling out the webbing 16. The takeup reel 2 is constantly urged in a direction in which the webbing 16 is taken up, by a takeup spring coupled to a takeup shaft of the takeup reel 2. At a collision, the rotation of the takeup shaft is prevented by a known emergency lock mechanism 13, so that the webbing 16 will not be spooled out any further.

In the retractor 1 with a pretensioner, a pretensioner 3, which is a seat belt tightening apparatus for rotating the takeup shaft in a direction in which the looseness of the seat belt is removed at a vehicle collision, is disposed on one base side wall of a retractor base 18 formed in a substantially U-shaped configuration. The retractor 1 with a pretensioner is mounted on a vehicle body panel as an assembly onto which the pretensioner 3 is integrally fitted in advance.

The aforementioned pretensioner 3 is arranged such that a tensile force is exerted on a wire 7 which is a transmission member wound around an unillustrated pulley pivotally attached to-one end of, for instance, a takeup shaft, and as the wire 7 retracts and drives the shaft in the webbing taking-up direction, the webbing 16 which is applied to the occupant is retracted at the time of an emergency. The pretensioner 3 has a driving means 4 for exerting tension upon the wire 7 and a starting device 21 for actuating the driving means 4 by detecting the vehicle collision.

The driving means 4 is comprised of a piston 6 coupled to one end of the wire 7, a cylinder 5 for slidably accommodating the piston 6, a housing 15 for allowing a proximal end of the cylinder 5 and a gas blow-off portion of a gas generator 8 to communicate with and coupled to each other, and the starting device 21 actuates the gas generator 8 in response to an acceleration of a predetermined level or more.

The housing member 15 is a substantially L-shaped tubular member which is bent substantially orthogonally. The proximal end of the cylinder 5 is fixed in one opening 19 of the housing member 15, and the wire 7 coupled to the piston 6 is inserted in a hole 20 provided in face-to-face relation to the opening 19.

A circular pipe-shaped protective wall 17 is provided at a peripheral edge of the hole 20 within the housing 15 in such a manner as to project toward the opening 19. The wire 7 located in the housing 15 below a lower end face of the piston 6 is covered with the protective wall 17.

The gas generator 8 is arranged such that a detonator 10 is fitted in a case 12 which accommodates an explosive 11 and is sealed onto a frame. When the detonator 10 is struck and the explosive 11 is ignited, an inflated gas is blown off from the gas blow-off portion at a tip of the case 12. For this reason, the starting device 21 for striking the detonator 10 with a side wall of the retractor base 18 placed in between is fixed to the retractor base 18 on the side of the detonator 10 of the gas generator 8.

Figure 2:
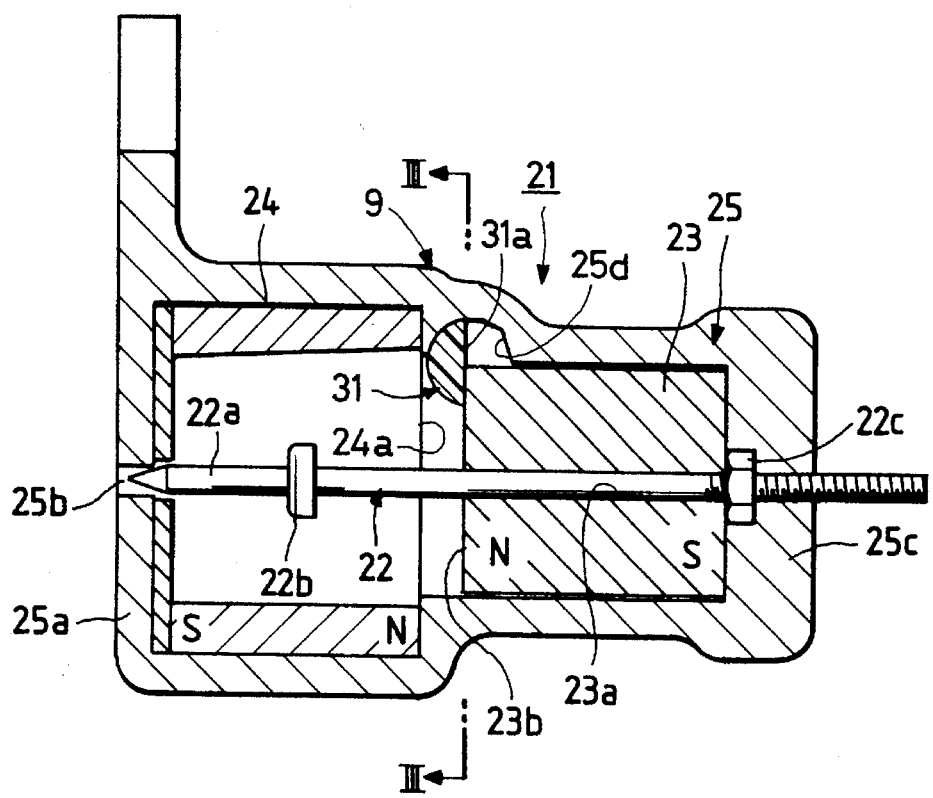
FIG. 2 is a vertical cross-sectional view of the starting device shown in FIG. 1.

As shown in FIG. 2, the starting device 21 is comprised of a firing pin 22 made of a nonmagnetic material such as stainless steel and capable of firing the detonator 10 by moving toward the detonator and colliding against the detonator 10; an inertial mass 23 made of a cylindrical permanent magnet in which a through hole 23a, through which the firing pin 22 is inserted loosely, is provided along the central axis; an annular permanent magnet 24 having an inside diameter larger than the outside diameter of the inertial mass 23; a trigger case 25 in which these members are disposed and which is secured on the side wall of the retractor base 18; and an erroneous-actuation preventing mechanism 9 disposed in the trigger case 25 for preventing the erroneous actuation of the starting device 21. The trigger case 25 is provided with a guide hole within which the inertial mass 23 is moved. It should be noted that, as the permanent magnets, it is possible to use not only KS steel and Alnico magnets but also sintered magnets and plastic magnets consisting of ferrite magnets, rare earth magnets, and the like.

A plunger 22a for striking the detonator 10 is formed at a tip of the firing pin 22, and a collar 22b is formed at a proximal portion of the plunger 22a. The firing pin 22 is disposed in the trigger case 25 with a rear end portion of the firing pin 22 slidably fitted in a bottom wall 25C of the trigger case 25. At this time, the firing pin 22 is prevented from moving toward the detonator relative to the inertial mass 23 since a nut 22c fitted on a rear end of the firing pin 22 which has been passed through the through hole 23a of the inertial mass 23 abuts against a bottom wall-side end of the inertial mass 23. Thus, the movement of the firing pin 22 toward the detonator side is restricted in an initial state. It should be noted that, instead of the nut 22c, a caulking member or the like may be fixed permanently to the firing pin 22.

As such, the plunger 22a is passed through an opening 25b formed in a wall 25a of the detonator-side trigger case 25 and opposes the detonator 10 with a gap therebetween. At the same time, the collar 22b opposes an inner wall surface of the wall 25a with a gap therebetween. Accordingly, if the inertial mass 23 collides against the collar 22b, the firing pin 22 to which the kinetic energy has been supplied by the inertial mass 23 moves toward the detonator side, thereby causing the plunger 22a to strike and ignite the detonator 10.

The annular permanent magnet 24 is fitted in the trigger case 25 on the detonator side thereof, and the inertial mass 23 fitted loosely over the firing pin 22 is fitted in the trigger case 25 on the bottom wall side thereof.

The inertial mass 23 is arranged such that its detonator-side end 23b has a gap with respect to a bottom wall-side end 24a of the annular permanent magnet 24, and their adjacent poles assume the same polarity (in the drawing, N pole— N pole). Accordingly, the inertial mass 23 is urged toward the bottom wall side away from the detonator 10 by means of the magnetic repulsive force acting between the annular permanent magnet 24 and the inertial mass 23.

Namely, although the inertial mass 23 is slidable in the axial direction along the firing pin 22, the inertial mass 23 cannot move toward the detonator unless a force toward the detonator of a magnitude exceeding the magnetic repulsive force acting between the annular permanent magnet 24 and the inertial mass 23 acts on the inertial mass 23, so that the starting device 21 is not actuated.

In a state in which the erroneous-actuation preventing mechanism 9 is deactivated, and its shaft 31 does not interfere with the inertial mass 23, if an inertial force of the inertial mass with the weight of the inertial mass 23 multiplied by the acceleration in the direction toward the detonator becomes greater than the magnetic repulsive force, the inertial mass 23 moves toward the detonator (leftward in the drawing), as shown in FIG. 5(a).

Further, when the inertial mass 23 moves to an area where the magnetic attractive force acts on the inertial mass 23, the inertial mass 23 is accelerated toward the detonator by the magnetic attractive force, is inserted into a bore of the annular permanent magnet 24, and collides against the collar 22b, as shown in FIG. 5(b). Thus, the inertial mass 23 has both a function as an acceleration sensor making use of the phenomenon in which magnetic force undergoes a change from repulsive force to attractive force and a function as a trigger means for starting the supply of impact energy of the firing pin 22. It should be noted that since the firing pin 22 itself generally starts to move by means of the acceleration in the direction toward the detonator, it does not necessarily follow that the inertial mass 23 and the collar 22b abut against each other at the position illustrated in the drawing.

Furthermore, the inertial mass 23 which has been accelerated toward the detonator by means of the magnetic attractive force moves the firing pin 22 toward the detonator as shown in FIG. 5(c), and strikes and ignites the detonator 10 by means of its plunger 22a. It should be noted that a setting is generally provided such that the detonator 10 is ignited before the collar 22b of the firing pin 22 abuts against the inner wall surface of the wall 25a.

The above-described starting device 21 is provided with the erroneous-actuation preventing mechanism 9 for preventing the erroneous actuation of the starting device 21 before the retractor 1 with a pretensioner is installed in the vehicle as an assembly.

The aforementioned erroneous-actuation preventing mechanism 9 has the shaft 31 which is formed of a nonmagnetic material and serves as a restricting means for selectively setting the inertial mass 23 in a nonmovable state and in a movable state. The shaft 31 is fitted in a hole 25d provided between the bottom wall-side end 24a of the annular permanent magnet 24 and the detonator-side end 23b of the inertial mass 23 in such a manner as to cross an upper portion of the guide hole of the trigger case 25.

Figure 3:
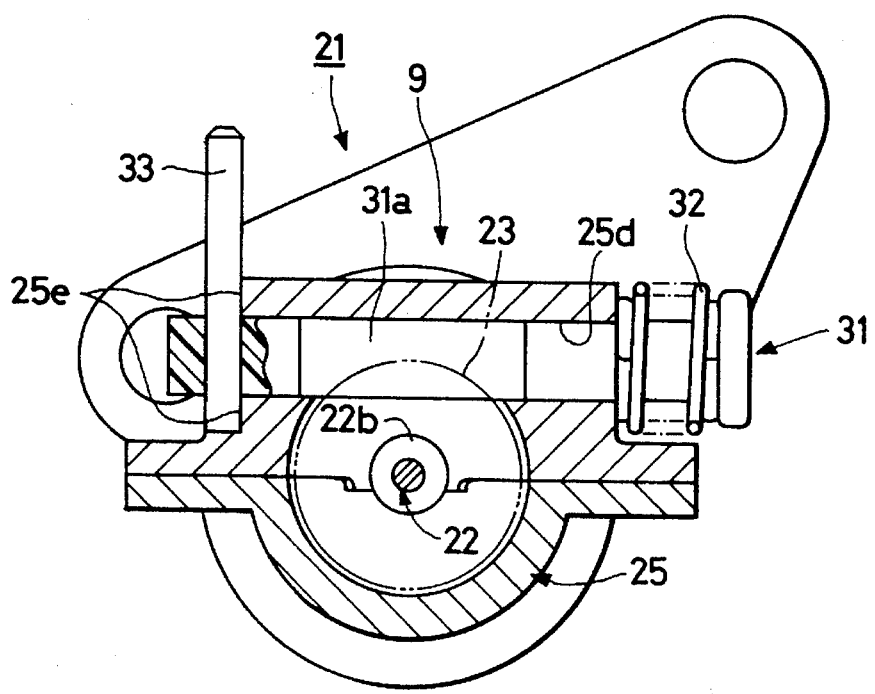
FIG. 3 is a cross-sectional view of the starting device shown in FIG. 2, the view being taken in the direction of arrows along line III—III.

As shown in FIG. 3, the shaft 31 has one end whose diameter is enlarged to prevent the shaft 31 from coming off the trigger case 25, and a compression coil spring 32 is wound around that end. A spring pin 33 is secured to the other end of the shaft 31 by means of pressure fitting, so that the shaft 31 is rotatable within a predetermined range as the spring pin 33 is manipulated, as will be described later. In addition, an intermediate portion of the shaft 31 corresponding to the guide hole of the trigger case 25 is formed with a substantially semicircular cross section, so that a notched portion 31a capable of assuming a rotational phase in which the notched portion 31a does not interfere with the inertial mass 23 is thereby formed.

Figure 4:
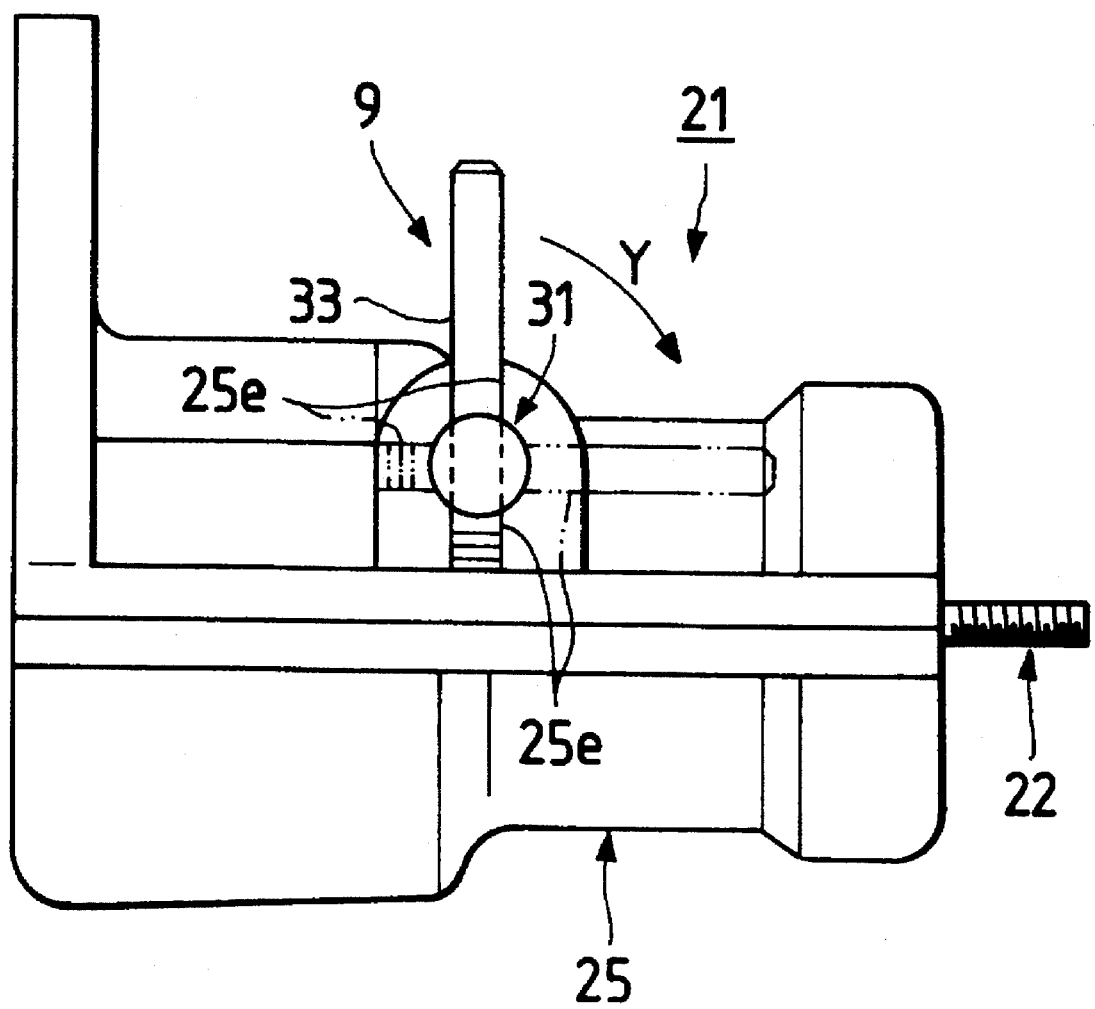
FIG. 4 is a front plane view of the starting device shown in FIG. 2.

As shown in FIG. 4, pairs of recesses 25e for fitting the spring pin 33 and arranged in such a manner as to be perpendicular to each other are formed at equal intervals at a peripheral end of the hole 25d opposing the spring pin 33. The spring pin 33 is held in a desired pair of recesses 25e by means of the urging force of the compression coil spring 32. Therefore, if the shaft 31 is moved in the axial direction against the urging force of the compression coil spring 32, and after spring pin 33 is temporarily disengaged from the recesses 25e, if the spring pin 33 is rotated and fitted in another pair of recesses 25e, the shaft 31 can be held with a rotational phase difference of about 90 degrees. It should be noted that the means for fixing the shaft 31 in the rotational direction thereof is not limited to the spring pin 33 and the recesses 25e such as those described above, and may be implemented by, for example, a rotation limiter and a snap action spring or the like.

In a state in which the erroneous-actuation preventing mechanism 9 is set, the spring pin 33 is in a position shown in FIG. 4, in which the bottom of the notched portion 31a of the shaft 31 opposes an upper portion of the detonator-side end 23b of the inertial mass 23. Therefore, the inertial mass 23 and the shaft 31 interfere with each other, so that the inertial mass 23 is set in the nonmovable state in which the inertial mass 23 is prevented from moving toward the detonator. The firing pin 22, in which the nut 22c fitted on its rear end is in contact with the bottom wall-side end of the inertial mass 23, is also prevented from moving toward the detonator relative to the inertial mass 23. Hence, the starting device 21 is nonoperable (see FIGS. 2 and 3).

Namely, since the inertial mass 23 which detects the acceleration of the vehicle directly imparts impact energy to the detonator 10, a trigger shaft for canceling the restriction of movement of the firing pin 22 in response to the movement of the inertial mass 23 and an urging member for urging the firing pin 22 toward the detonator become unnecessary. At the same time, the movement of the firing pin 22 toward the detonator is prevented by simply preventing the movement of the inertial mass 23 toward the detonator. Hence, the erroneous actuation of the starting device 21 can be prevented by a simple structure.

Next, when the retractor 1 with a pretensioner is installed in the vehicle and the erroneous-actuation preventing mechanism 9 is deactivated, the shaft 31 is moved in the axial direction against the urging force of the compression coil spring 32, and the spring pin 33 is rotated about 90 degrees in the direction of arrow Y, and is fitted in another pair of recesses 25e, as shown by the phantom lines in FIG. 4. Then, the shaft 31 also rotates about 90 degrees in the direction of arrow Y, and the aforementioned notched portion 31a is set in the position in which the notched portion 31a does not interfere with the inertial mass 23, as shown in FIG. 1. Hence, the inertial mass 23 is set in the movable state permitting movement toward the detonator, so that the starting device 21 is set in an operable state.

When the aforementioned erroneous-actuation preventing mechanism 9 is set so as to set the starting device in the nonoperable state, a gap due to a dimensional tolerance occurs between the bottom of the notched portion 31a and the detonator-side end 23b. However, even if the inertial mass 23 moves toward the detonator by the portion of the gap owing to an unexpected impact, the inertial mass 23 is pushed back toward the bottom wall side away from the detonator 10 by means of the magnetic repulsive force with respect to the annular permanent magnet 24. Hence, the firing pin 22 is prevented from igniting the detonator 10 the moment when the erroneous-actuation preventing mechanism 9 is deactivated so as to set the inertial mass 23 in the movable state. Accordingly, the erroneous-actuation preventing mechanism 9 is capable of positively preventing the erroneous actuation of the starting device 21 under all circumstances, and the mechanism for pushing back the firing pin 22 to a predetermined position becomes unnecessary.

Next, a description will be given of the operation of the retractor 1 with a pretensioner.

In an ordinary running state of a vehicle, the pretensioner 3 is not engaged with the takeup shaft, so that the takeup shaft is freely rotatable. Accordingly, the webbing 16 can be taken up by the urging force of the takeup spring, and the webbing 16 can be freely spooled out against the spring force.

When a deceleration of certain magnitude, such as a sudden braking, occurs in the vehicle, the emergency lock mechanism 13 of the retractor is actuated to lock the rotation of the takeup shaft. As a result, the rolling out of the webbing is prevented, but the inertial force acting on the inertial mass 23 is smaller than the magnetic repulsive force acting between the annular permanent magnet 24 and the inertial mass 23, and the starting device 21 is not actuated, so that the driving means 4 of the pretensioner 3 is not actuated.

On the other hand, when a predetermined deceleration of a very large magnitude, such as the one at a vehicle collision, occurs, the inertial force acting on the inertial mass 23 becomes greater than the magnetic repulsive force acting between the annular permanent magnet 24 and the inertial mass 23, and the inertial mass 23 moves toward the detonator and collides against the collar 22b. As a result, the firing pin 22 strikes and ignites the detonator 10. The ignition of the detonator 10 fires the gas generator 8 in the driving means 4, and upon generation of a combustion gas in the cylinder 5 by the gas generator 8, the piston 6 rapidly moves upward (in the direction of arrow X) by the pressure of the gas thus generated. When the wire 7 is rapidly pulled in the direction of arrow X with a force of a predetermined magnitude by the driving force of this piston 6, the takeup shaft is driven in the webbing taking-up direction. Hence, the webbing 16 applied to the occupant is retracted, thereby eliminating the play of the seat belt.

FIG. 6 is a vertical cross-sectional view of a starting device 41 in accordance with a second embodiment of the present invention, and FIG. 7 is a cross-sectional view taken in the direction of arrows along line VII—VII of FIG. 6. It should be noted that mechanism portions similar to those of the starting device 21 in the foregoing embodiment will be denoted by the same reference numerals, and description thereof will be omitted.

An erroneous-actuation preventing mechanism 42 of the starting device 41 in this embodiment has a shaft 43 with an octagonal cross section which is a restricting means for selectively setting the inertial mass 23 in the nonmovable state and in the movable state. The shaft 43 is fitted in a hole 45 with an octagonal cross section provided between the bottom wall-side end 24a of the annular permanent magnet 24 and the detonator-side end 23b of the inertial mass 23 in such a manner as to cross an upper portion of the guide hole of the trigger case 25.

As shown in FIG. 7, the shaft 43 has one end whose diameter is enlarged to prevent the shaft 43 from coming off the trigger case 25, while a snap-action spring 44 with its opposite ends supported is fitted to the other end of the shaft 43, and the shaft 43 is slidable in the axial direction within a predetermined range. In addition, an abutment surface 43b opposing the inertial mass 23 is formed in an intermediate portion of the shaft 43 corresponding to the guide hole of the trigger case 25, and an arcuate notched portion 43a for assuming a state in which the notched portion 43a does not interfere with the inertial mass 23 is formed.

In a state in which the erroneous-actuation preventing mechanism 42 is set, the shaft 43 is held in the position, as shown in FIG. 7, by means of the urging force of the snap-action spring 44, and the abutment surface 43b of the shaft 43 is opposed to an upper portion of the detonator-side end 23b of the inertial mass 23. Therefore, the inertial mass 23 and the shaft 43 interfere with each other, so that the inertial mass 23 is set in the nonmovable state in which the inertial mass 23 is prevented from moving toward the detonator. The firing pin 22, in which the nut 22c fitted on its rear end is in contact with the bottom wall-side end of the inertial mass 23, is also prevented from moving toward the detonator relative to the inertial mass 23. Hence, the starting device 21 is nonoperable.

Next, when the erroneous-actuation preventing mechanism 42 is deactivated, the shaft 43 is moved in the axial direction (leftward in the drawing) against the urging force of the snap-action spring 44. Then, the urging direction of the snap-action spring 44 is inverted, and the shaft 43 is urged leftward in the drawing, and its enlarged-diameter portion is held in the position in which it abuts against the trigger case 25. At this time, the notched portion 43a corresponds to the guide hole of the trigger case 25, and assumes a position in which the notched portion 43a does not interfere with the inertial mass 23. Hence, the inertial mass 23 is set in the movable state permitting movement toward the detonator, so that the starting device 21 is set in the operable state. It should be noted that although the shaft 43 and the hole 45 are formed with an octagonal cross section, it suffices if they are provided with a cross-sectional configuration which does not allow the shaft 43 to rotate about its axis. Hence, the shaft 43 and the hole 45 may assume other cross-sectional configurations such as a polygon, a semicircle and the like.

It should be noted that configurations of the various members constituting the starting device of the present invention are not confined to those of the foregoing embodiments, and it goes without saying that various forms may be adopted in accordance with the main gist of the present invention. Also, it goes without saying that the structures of the starting device and the pretensioner may be altered, as required.

For instance, although, in the foregoing embodiments, the inertial mass is set in the nonmovable state and in the movable state by directly manipulating the shaft which is the restricting means of the erroneous-actuation preventing mechanism, these states may be changed over by means of a manipulating member installed at a place which facilitates the manipulation by connecting an interlocking mechanism such as a link mechanism or a wire to the manipulating member.

In addition, in the foregoing embodiments, the inertial mass 23, which moves toward the detonator faster than the firing pin 22, ignites the detonator 10 by being made to collide against the collar 22b of the firing pin 22 which is prevented from moving toward the detonator relative to the inertial mass 23. Thus, the amount of movement of the inertial mass 23 is made large to obtain a sufficient velocity for igniting the detonator 10 within a limited space. However, the firing pin may be fixed to the inertial mass and formed integrally therewith.

Further, although, in the foregoing embodiments, the starting device of the present invention is applied as a starting device for actuating the gas generator of a seat belt tightening apparatus, the present invention is not limited to the same, and may be equally applied to a starting device for actuating a gas generator of an air bag apparatus.

FIGS. 8 to 14 show a third embodiment of the present invention. This embodiment differs from the first and second embodiments in an erroneous-actuation preventing mechanism 109 for preventing the erroneous actuation of a starting device 121. In the drawings, component elements which are identical to those of the first embodiment will be denoted by the same reference numerals, and description thereof will be omitted. FIGS. 8 and 9 are a partial side plane view and a partial rear view of a retractor 101 with a pretensioner which is provided with a starting device in accordance with this embodiment.

In the retractor 101 with a pretensioner, the pretensioner 3, which is a seat belt tightening apparatus for rotating the takeup shaft in the direction in which the looseness of the seat belt is removed at a vehicle collision, is disposed on one base side wall 18a of the retractor base 18 formed in a substantially U-shaped configuration. The retractor 101 with a pretensioner is mounted on a vehicle body panel 136 as an assembly onto which the pretensioner 3 is integrally fitted in advance. For this purpose, an upper stay 134 extending upwardly from the retractor and a lower stay 135 extending downwardly therefrom are secured to a rear plate 18c of the retractor base 18. Bolts 144 and nuts 146, which constitute joining means, are tightened through bolt holes provided in the respective stays onto the vehicle body panel 136, so as to secure the retractor 101 with a pretensioner (the bolt and the nut on the upper stay 134 side are not shown).

The starting device 121 has the erroneous-actuation preventing mechanism 109 for preventing the actuation of the starting device 121 before the retractor 101 with a pretensioner is installed in the vehicle as an assembly.

The erroneous-actuation preventing mechanism 109 is comprised of a stopper 131 made of a nonmagnetic material and serving as a restricting means capable of preventing the movement of the inertial mass 23; a compression coil spring 132 which is an urging means for urging the stopper 131 in a direction in which the inertial mass 23 is set in a nonmovable state; the bolts 144 and the nuts 146 constituting the joining means for securing onto the vehicle body panel 136 the retractor 101 with a pretensioner which is an assembly with the starting device 121 mounted thereon; a bolt cover 141 which is a manipulating member disposed swingably on the lower stay 135 of the retractor 101 with a pretensioner and capable of covering the bolt head of the bolt 144; a spring hook 145 which is a swinging-motion restricting means for preventing the swinging motion in such a manner as to prevent the bolt cover 141 from covering the bolt head of the bolt 144 when the bolt 144 is not tightened positively; and a release cable 133 which is an interlocking means for interlocking the stopper 131 with the swinging motion of the bolt cover 141.

As shown in FIG. 10, the stopper 131 is arranged such that its distal end is capable of being inserted into or moved out of the trigger case 25. The stopper 131, together with the compression coil spring 132 for urging the stopper 131 in the direction of insertion of that distal end into the trigger case 25, is accommodated in a housing 150 which is disposed on an outer peripheral portion of the trigger case 25 integrally with the trigger case 25. In addition, one end of a wire 139 of the release cable 133 is retained at a rear end of the stopper 131, and the wire 139 is covered with a flexible tube 138.

As shown in FIGS. 11 and 12, the bolt cover 141 is axially supported swingably by a pin 142 which is inserted in support walls 135a rising vertically from both side edges of the lower stay 135. A tapping screw 143 is provided at a swinging end of the bolt cover 141 so as to fix the bolt cover 141 in a state in which the bolt head of the bolt 144 is covered therewith. Further, the other end of the wire 139 is retained at the bolt cover 141 by means of a caulked ball 140, and the distal end of the stopper 131 is inserted into or moved out of the trigger case 25 in interlocking relation to the swinging motion of the bolt cover 141.

The spring hook 145 has an opening through which the bolt 144 is inserted, and a lower end of the spring hook 145 is secured to the lower stay 135 by means of a caulked pin 147, and is formed by being bent in such a manner as to be provided with a gap between the same and the lower stay 135. Furthermore, an engaging hole 145a is formed at an upper end of the spring hook 145, and is capable of engaging with a hook pawl 141a projecting from a rear end of the bolt cover 141.

The length of the wire 139 is set as follows. When the bolt cover 141 is in an open position for permitting the fitting and removal of the bolt 144, the distal end of the stopper 131 is inserted in the trigger case 25 by being urged by the compression coil spring 132. Meanwhile, when the bolt cover 141 is in a closing position for rendering the fitting and removal impossible by covering the bolt 144, the distal end of the stopper 131 is retracted from within the trigger case 25.

Before the retractor 101 with a pretensioner, which is an assembly, is installed in the vehicle, the bolt cover 141 is in the open position permitting the fitting and removal of the bolt 144 as shown in FIG. 11, the distal end of the stopper 131 is inserted into the trigger case 25 by being urged by the compression coil spring 132, and projects in such a manner as to oppose the detonator-side end 23b of the inertial mass 23, as shown in FIG. 13. Therefore, the inertial mass 23 is prevented from moving toward the detonator. In addition, the bolt cover 141 located in the open position is prevented from swinging (rotating in the direction of arrow A in the drawing) to the closing position for rendering the fitting and removal impossible by covering the bolt 144 since the hook pawl 141a is engaged with the engaging hole 145a of the spring hook 145. It should be noted that the upper end of the spring hook 145 is urged by its resiliency in a direction in which the engaging hole 145a is engaged with the hook pawl 141a. In addition, an opening 135b is formed in the lower stay 135 so as not to interfere with the engaging portions of the engaging hole 145a and the hook pawl 141a.

Namely, the distal end of the stopper 131 cannot be retracted from within the trigger case 25 unless the bolt cover 141 is rotated in the direction of arrow A and is swung to the closing position. Hence, the inertial mass 23 remains in the nonmovable state in which it is prevented from moving toward the detonator, so that the starting device 121 is nonoperable.

Next, even if the unillustrated bolt and nut on the upper stay 134 side are tightened onto the vehicle body panel 136 so as to install the retractor 101 with a pretensioner at a predetermined position of the vehicle, unless the bolt 144 and the nut 146 on the lower stay 135 side are tightened, the spring hook 145 still prevents the rotation of the bolt cover 141 in the direction of arrow A, as shown in FIG. 11. Hence, the inertial mass 23 remains in the nonmovable state in which it is prevented from moving toward the detonator, so that the starting device 121 is nonoperable. Furthermore, even if an attempt is made to set the inertial mass 23 in the movable state by rotating the bolt cover 141 in the direction of arrow A without tightening the bolt 144 and the nut 146 on the lower stay 135 side, since the hook pawl 141a remains engaged with the engaging hole 145a, the bolt cover 141 cannot be rotated in the direction of arrow A.

Then, as shown in FIG. 14, when the spring hook 145, together with the lower stay 135, is tightened onto the vehicle body panel 136 by tightening the bolt 144 and the nut 146, the spring hook 145 is brought into pressure contact with the lower stay 135 via a plain washer 148 fitted on the bolt 144. As a result, since the upper portion of the spring hook 145 is moved in a direction (leftward in the drawing) in which the engaging hole 145a is disengaged from the hook pawl 141a, the engagement between the engaging hole 145a and the hook pawl 141a is canceled, thereby rendering the bolt cover 141 movable in the direction of arrow A.

It should be noted that since, in this state, the swinging end of the bolt cover 141 projects on the vehicle compartment side (on the right-hand side in the drawing), if an attempt is made to fit interior trim 137, i.e., a cover member for covering the retractor 101 with a pretensioner, to the vehicle body, the interior trim 137 interferes with the bolt cover 141 and, therefore, cannot be fitted.

Next, if the bolt cover 141 is rotated in the direction of arrow A, and is swung to the closing position for rendering the fitting and removal impossible by covering the bolt head of the bolt 144 as shown in FIGS. 8 and 9, the wire 139 of the release cable 133 is drawn out to a position in which the distal end of the stopper 131 is retracted from within the trigger case 25 and the inertial mass 23 becomes movable, as shown in FIG. 10. Then, as the tapping screw 143 fitted on the swinging end of the bolt cover 141 is threadedly secured to the lower stay 135, the bolt cover 141 covers the bolt head of the bolt 144, and is secured in a state for rendering the inertial mass 23 movable. Only in this state the interior trim 137 can be fitted to the vehicle body for the first time, as shown in FIG. 8. Accordingly, the interior trim 137 is prevented from being fitted to the vehicle body with the starting device 121 remaining in the nonoperable state.

Namely, the retractor 101 with a pretensioner as an assembly is mounted on the vehicle panel 136 by means of the bolts 144, and unless the bolt cover 141 is located in the closing position for rendering the fitting and removal of the bolt 144 impossible by covering the same, the starting device 121 is not set in the operable state. Accordingly, it is possible to prevent the erroneous actuation of the pretensioner 3 in a vehicle assembly line, or erroneous actuation such as during the webbing replacement work at a repair factory.

In addition, unless the bolt cover 141 is located at the closing position for rendering the fitting and removal of the bolt 144 impossible by covering the bolt head, its swinging end interferes with the interior trim 137 to prevent the continuation of the operation of mounting on the vehicle body. Therefore, the operation of mounting on the vehicle body is not finished with the retractor 101 with a pretensioner remaining in the nonoperable state.

Accordingly, the starting device 121 of the retractor 101 with a pretensioner, when installed on the vehicle body, in no cases remains in the nonoperable state, and can be provided with the erroneous-actuation preventing mechanism 109 which is capable of positively and easily preventing the erroneous actuation and has excellent assembling efficiency.

It should be noted that configurations of the various members constituting the starting device of the present invention are not confined to those of the foregoing embodiment, and it goes without saying that various forms may be adopted in accordance with the main gist of the present invention. Also, it goes without saying that the structures of the starting device and the pretensioner may be altered, as required.

Further, although, in the foregoing embodiment, the starting device of the present invention is applied as a starting device for actuating the gas generator of a seat belt tightening apparatus, the present invention is not limited to the same, and may be applied to a starting device for actuating a gas generator of an air bag apparatus as well. That is, the starting device of the present invention may be equally applied to the air bag apparatus by disposing an erroneous-actuation preventing mechanism having an arrangement similar to the above-described erroneous-actuation preventing mechanism 109 in the vicinity of a joining means for securing a subassembly of the air bag apparatus such as an inflator to a housing on a steering wheel, and by providing an arrangement such that the swinging end of the manipulating member for moving the restricting means in a direction in which the inertial mass is set in the nonmovable state interferes with a cover member such as a center pad or a housing.

In accordance with the starting device of the present invention, when an acceleration of a predetermined level or more toward the detonator has occurred in the inertial mass made of the cylindrical permanent magnet, the inertial mass moves toward the detonator in a bore of the annular permanent magnet against the magnetic repulsive force with respect to the annular permanent magnet, and moves the firing pin toward the detonator with magnetic attractive force. Thus, the inertial mass itself imparts impact energy to the detonator. Accordingly, a trigger shaft for canceling the restriction of movement of the firing pin in response to the movement of the inertial mass and an urging member for urging the firing pin toward the detonator become unnecessary. At the same time, the firing pin is prevented from moving toward the detonator simply by preventing the movement of the inertial mass toward the detonator. Therefore, it is possible to prevent the erroneous actuation of the starting device with a simple structure.

In addition, when the inertial mass is set in the nonmovable state by the restricting means, even if the inertial mass moves toward the detonator by the portion of the gap occurring between the restricting means for restricting the movement of the inertial mass and a retaining portion for retaining the inertial mass by an unexpected impact, the inertial mass is pushed back to a predetermined position by the magnetic repulsive force with respect to the annular permanent magnet. Hence, the firing pin is prevented from igniting the detonator the moment the restricting means is deactivated to set the inertial mass in the movable state. Accordingly, it is possible to positively prevent the erroneous actuation of the starting device under any circumstances. At the same time, a mechanism for pushing back the firing pin to a predetermined position becomes unnecessary, and the structure does not become complicated.

Accordingly, it is possible to provide a starting device having an inexpensive erroneous-actuation preventing mechanism which is capable of positively and easily preventing the erroneous actuation of the starting device.

In addition, in accordance with the starting device of the present invention, unless the joining means for securing an assembly, such as a seat belt tightening apparatus or an air bag apparatus, which is provided with the starting device is positively tightened, the manipulating member cannot be swung to the closing position. Therefore, unless the assembly is secured to the vehicle body, the inertial mass is in a nonmovable state, with the result that the starting device cannot be actuated. Accordingly, there is no possibility of the starting device being erroneously actuated during an operation in a vehicle assembly line or at a repair factory.

Furthermore, unless the manipulating member is swung from the open position to the closing position to move the restricting means in a direction in which the inertial mass becomes movable, the swinging end of the manipulating member interferes with a cover member for covering the assembly, thereby hampering the continuation of the operation of installation on the vehicle body. Therefore, after the assembly is secured to the vehicle body, the manipulating member must be held in a state in which it is swung positively to the closing position. Accordingly, there is no possibility of the operation of installation on the vehicle body being finished with the starting device remaining in the nonoperable state.

Thus, it is possible to provide a starting device having an erroneous-actuation preventing mechanism which has excellent assembling efficiency and is capable of positively and easily preventing the erroneous actuation of the starting device without being installed on the vehicle body in the nonoperable state.

While the invention has been described in detail and with reference to specific examples thereof, it will be apparent to one skilled in the art that various changes and modifications can be made therein without departing from the spirit and scope thereof.

What is claimed is:

1. A starting device for actuating a gas generator by striking a detonator in response to an acceleration of a predetermined level or more, comprising:

a firing pin capable of igniting said detonator by moving toward said detonator and colliding against said detonator;

an inertial mass comprising a cylindrical permanent magnet slidably mounted with respect to said firing pin and moveable toward said detonator so as to apply kinetic energy to said firing pin in accordance with a force of inertia of said inertial mass which is a product of the weight of said inertial mass and an acceleration of said inertial mass;

an annular permanent magnet having an inside diameter larger than an outside diameter of said inertial mass;

a trigger case, said firing pin, said inertial mass, and said annular permanent magnet being disposed in said trigger case so that a first magnetic pole of said annular permanent magnet confronts a second magnetic pole of said inertial mass, which has the same polarity as said first magnetic pole, and wherein said first and second magnetic poles produce a magnetic repulsion force which urges said inertial mass in a direction substantially opposite toward said detonator; and an erroneous-actuation preventing mechanism for preventing the erroneous actuation of said starting device, said erroneous-actuation preventing mechanism including restricting means for selectively setting said inertial mass in a nonmoveable state and in a moveable state;

wherein said inertial mass and said firing pin are arranged coaxially, said inertial mass is provided with a through hole through which said firing pin is fitted loosely, and said firing pin has a movement-preventing portion for preventing said firing pin from moving relative to said inertial mass toward at least said detonator.

2. A starting device according to claim 1, wherein said restricting means comprises a stopper whose distal end can be inserted in or removed from said trigger case and which is urged by urging means in a direction in which said inertial mass is set in the nonmovable state.

3. A starting device according to claim 1, wherein said restricting means comprises a shaft attached rotatably to said trigger case.

4. A starting device according to claim 3, wherein:

said trigger case is provided with a guide hole within which said inertial mass is moved;

said shaft is fitted in a hole which is provided in said trigger case so as to cross an upper portion of said guide hole of said trigger case, said shaft being rotatable between first and second positions and that in the first position the shaft allows the inertial mass to move and in the second position said shaft prevents said inertial mass from moving;

said shaft is formed with a notched portion defining an opening which allows said inertial mass to move in a direction in which said inertial mass is set in the movable state; and a bottom surface of said notched portion of said shaft interferes with an upper portion of a detonator-side end of said inertial mass so as to set said inertial mass in the nonmovable state in which said inertial mass is prevented from moving toward said detonator.

5. A starting device according to claim 1, wherein said restricting means comprises a shaft with a polygonal cross section which is slidably attached to said trigger case and is movable in an axial direction within a predetermined range.

6. A starting device according to claim 5, wherein said shaft is fitted in a hole with a corresponding polygonal cross section which is provided in said trigger case so as to cross an upper portion of a guide hole of said trigger case, said shaft being slidable between first and second positions and that in the first position the shaft allows the inertial mass to move and in the second position said shaft prevents said inertial mass from moving and wherein said shaft is formed with a notched portion defining an opening which allows said inertial mass to move in a direction in which said inertial mass is set in the movable state, and an abutment surface formed in an intermediate portion of said shaft interferes with an upper portion of a detonator-side end of said inertial mass so as to set said inertial mass in the nonmovable state in which said inertial mass is prevented from moving toward said detonator.

7. A starting device according to claim 1, wherein said movement-preventing portion comprises a nut fitted on a rear end of said firing pin, said firing pin passes through said through hole of said inertial mass and abuts against a bottom wall-side end of said inertial mass in said trigger case.

8. A starting device for actuating a seat belt tightening apparatus with a gas generator by striking a detonator in response to an acceleration of a predetermined level or more, said seat belt tightening apparatus having a retractor with a takeup reel having a takeup shaft and wound with a webbing for freely taking up or spooling out the webbing and a pretensioner for rotating the takeup shaft in a direction of removing the looseness of a seat belt so as to retract the webbing, said starting device for actuating said seat belt tightening apparatus comprising:

a firing pin movably mounted with respect to said detonator and capable of igniting said detonator by moving toward and colliding against said detonator;

an inertial mass comprising a cylindrical permanent magnet, said inertial mass being movably mounted with respect to said firing pin for supplying kinetic energy to said firing pin in accordance with a force of inertia of said inertial mass which is a product of the weight of said inertial mass and an acceleration of said inertial mass;

an annular permanent magnet having an inside diameter which is larger than an outside diameter of said inertial mass and being disposed in opposition to said inertial mass;

a trigger case, said inertial mass and said annular permanent magnet being disposed in said trigger case, a first magnetic pole of said annular permanent magnet confronting a second magnetic pole of said inertial mass, said second magnetic pole having the same polarity as said first magnetic pole, said first and second magnetic poles producing a magnetic repulsion force which urges said inertial mass in a direction away from said detonator; and an erroneous-actuation preventing mechanism for preventing the erroneous actuation of said starting device, said erroneous-actuation preventing mechanism including restricting means for selectively setting said inertial mass in a nonmovable state and in a movable state;

wherein said inertial mass and said firing pin are arranged coaxially, said inertial mass is provided with a through hole through which said firing pin is fitted loosely, and said firing pin has a movement-preventing portion for preventing said firing pin from moving relative to said inertial mass toward at least said detonator.

9. A starting device according to claim 8, wherein said movement-preventing portion comprises a nut fitted on a rear end of said firing pin, said firing pin passes through said through hole of said inertial mass and abuts against a bottom wall-side end of said inertial mass in said trigger case.

10. A starting device according to claim 8, wherein said restricting means comprises a stopper whose distal end can be inserted in or removed from said trigger case and which is urged by urging means in a direction in which said inertial mass is set in the nonmovable state.

11. A starting device according to claim 8, wherein said restricting means comprises a shaft attached rotatably to said trigger case.

12. A starting device according to claim 11, wherein;

said trigger case is provided with a guide hole within which said inertial mass is moved;

said shaft is fitted in a hole which is provided in said trigger case so as to cross an upper portion of said guide hole of said trigger case, said shaft being rotatable between first and second positions and that in the first position the shaft allows the inertial mass to move and in the second position said shaft prevents said inertial mass from moving;

said shaft is formed with a notched portion defining an opening which allows said inertial mass to move in a direction in which said inertial mass is set in the moveable state; and a bottom surface of said notched portion of said shaft interferes with an upper portion of a detonator-side end of said inertial mass so as to set said inertial mass in the nonmoveable state in which said inertial mass is prevented from moving toward said detonator.

13. A starting device according to claim 8, wherein said restricting means comprises a shaft with a polygonal cross section which is attached to said trigger case and is movable in an axial direction within a predetermined range.

14. A starting device according to claim 13, wherein:

said trigger case is provided with a guide hole within which said inertial mass is moved, said shaft is fitted in a hole with a corresponding polygonal cross section which is provided in said trigger case so as to cross an upper portion of said guide hole of said trigger case, said shaft being slidable between first and second positions and that in the first position the shaft allows the inertial mass to move and in the second position said shaft prevents said inertial mass from moving and wherein said shaft is formed with a notched portion defining an opening which allows said inertial mass to move in a direction in which said inertial mass is set in the moveable state, and an abutment surface formed in an intermediate portion of said shaft interferes with an upper portion of a detonator-side end of said inertial mass so as to set said inertial mass in the nonmoveable state in which said inertial mass is prevented from moving toward said detonator.

15. A starting device according to claim 8, wherein said erroneous-actuation preventing mechanism further includes:

urging means for urging said restricting means in a direction in which said inertial mass is set in the nonmovable state;

joining means for fixing said retractor with said starting device attached thereto onto a vehicle body;

a manipulating member disposed swingably on said retractor and capable of covering said joining means;

swinging-motion restricting means for rendering said manipulating member swingable in a state in which said joining means is tightened positively, and for preventing the swinging motion of said manipulating member in a state in which said joining means is not tightened positively; and interlocking means for interlocking said restricting means with said manipulating member in such a manner as to allow said restricting means to move in the direction in which said inertial mass is set in the movable state, against an urging force of said urging means by swinging said manipulating member.

16. A seat belt tightening apparatus for rotating a takeup shaft of a retractor in a seat-belt retracting direction at a vehicle collision by being driven under gas pressure, comprising:

a gas generator including a detonator for generating the gas pressure;

a starting device for actuating the gas generator by striking the detonator in response to an acceleration of a predetermined level or more, wherein said starting device comprises:

a firing pin movably mounted with respect to said detonator and capable of igniting said detonator by moving toward and colliding against said detonator;

an inertial mass made of a cylindrical permanent magnet and being movably mounted with respect to said firing pin for supplying kinetic energy to said firing pin in accordance with a force of inertia of said inertial mass which is a product of the weight of said inertial mass and an acceleration of said inertial mass; and an annular permanent magnet having an inside diameter larger than an outside diameter of said inertial mass, said annular permanent magnet being disposed in opposition to said inertial mass so that a first magnetic pole of said annular permanent magnet confronts a second magnetic pole of said inertial mass, said second magnetic pole having the same polarity as said first magnetic pole, said first and second magnetic poles producing a magnetic repulsion force which urges said inertial mass in a direction away from said detonator; and an erroneous-actuation preventing mechanism coupled to said starting device for preventing the erroneous actuation of said starting device, said erroneous-actuation preventing mechanism including;

restricting means for selectively setting in a nonmovable state and in a movable state said inertial mass fitted in said starting device;

urging means for urging said restricting means in a direction in which said inertial mass is set in the nonmovable state;

joining means for fixing said retractor with said starting device attached thereto onto a vehicle body;

a manipulating member disposed swingably on said retractor and capable of covering said joining means;

swinging-motion restricting means for rendering said manipulating member swingable in a state in which said joining means is tightened positively, and for preventing the swinging motion of said manipulating member in a state in which said joining means is not tightened positively; and interlocking means for interlocking said restricting means with said manipulating member in such a manner as to allow said restricting means to move in the direction in which said inertial mass is set in the movable state, against an urging force of said urging means by swinging said manipulating member.

* * * * *